United States Patent [19]

Kastan et al.

[11] Patent Number: 4,545,691
[45] Date of Patent: Oct. 8, 1985

[54] BICYCLE CRANK BEARING ASSEMBLY

[75] Inventors: B. Linn Kastan, 4946 N. Moorpark Rd., Moorpark, Calif. 93021; Ysmael E. Romero, Santa Paula, Calif.

[73] Assignee: B. Linn Kastan, Moorpark, Calif.

[21] Appl. No.: 514,529

[22] Filed: Jul. 18, 1983

[51] Int. Cl.[4] .................. F16C 9/02; F16C 35/077
[52] U.S. Cl. .................. 384/458; 384/538; 384/540; 403/370
[58] Field of Search .......... 308/179.5, 189 R, 192, 308/207 R, 236; 403/370, 371, 374; 74/594.1, 594.2

[56] References Cited

U.S. PATENT DOCUMENTS

| 2,257,401 | 9/1941 | Schwinn | 308/179.5 |
| 3,009,747 | 11/1961 | Pitzer | 403/371 X |
| 3,835,729 | 9/1974 | Tarutani | 74/611 |
| 3,903,754 | 9/1975 | Morroni | 74/594.1 |
| 3,919,898 | 11/1975 | Sugino | 74/594.2 |
| 4,093,325 | 6/1978 | Troccaz | 74/594.1 X |
| 4,240,677 | 12/1980 | Payne et al. | 308/236 X |
| 4,358,967 | 11/1982 | Kastan | 308/192 X |

Primary Examiner—Stuart S. Levy
Assistant Examiner—David Werner
Attorney, Agent, or Firm—Jack C. Munro

[57] ABSTRACT

A bearing assembly and method of installing such within an enclosing open walled chamber wherein the bearing assembly utilizes first and second spaced apart bearing units. The bearing units low frictionally rotationally support a crank. The inner races of the spaced apart bearing units are connected together through a sleeve which is located about the crank. Mounted on the outer race of each bearing assembly is an expanding ring assembly. Each expanding ring assembly can be moved into tight engagement with the wall of the chamber.

11 Claims, 12 Drawing Figures

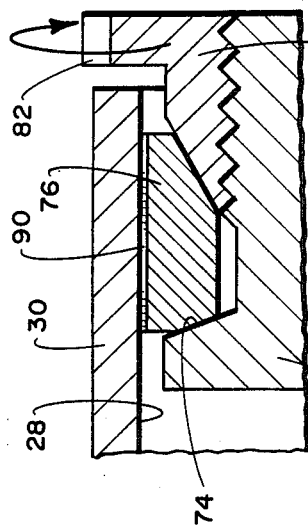
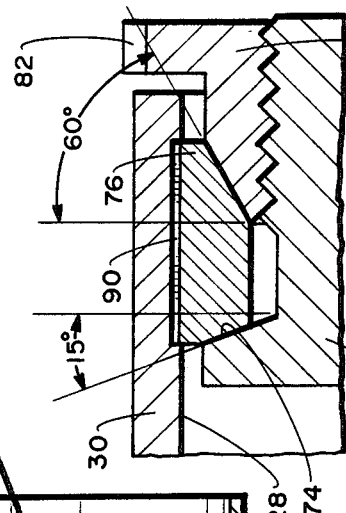
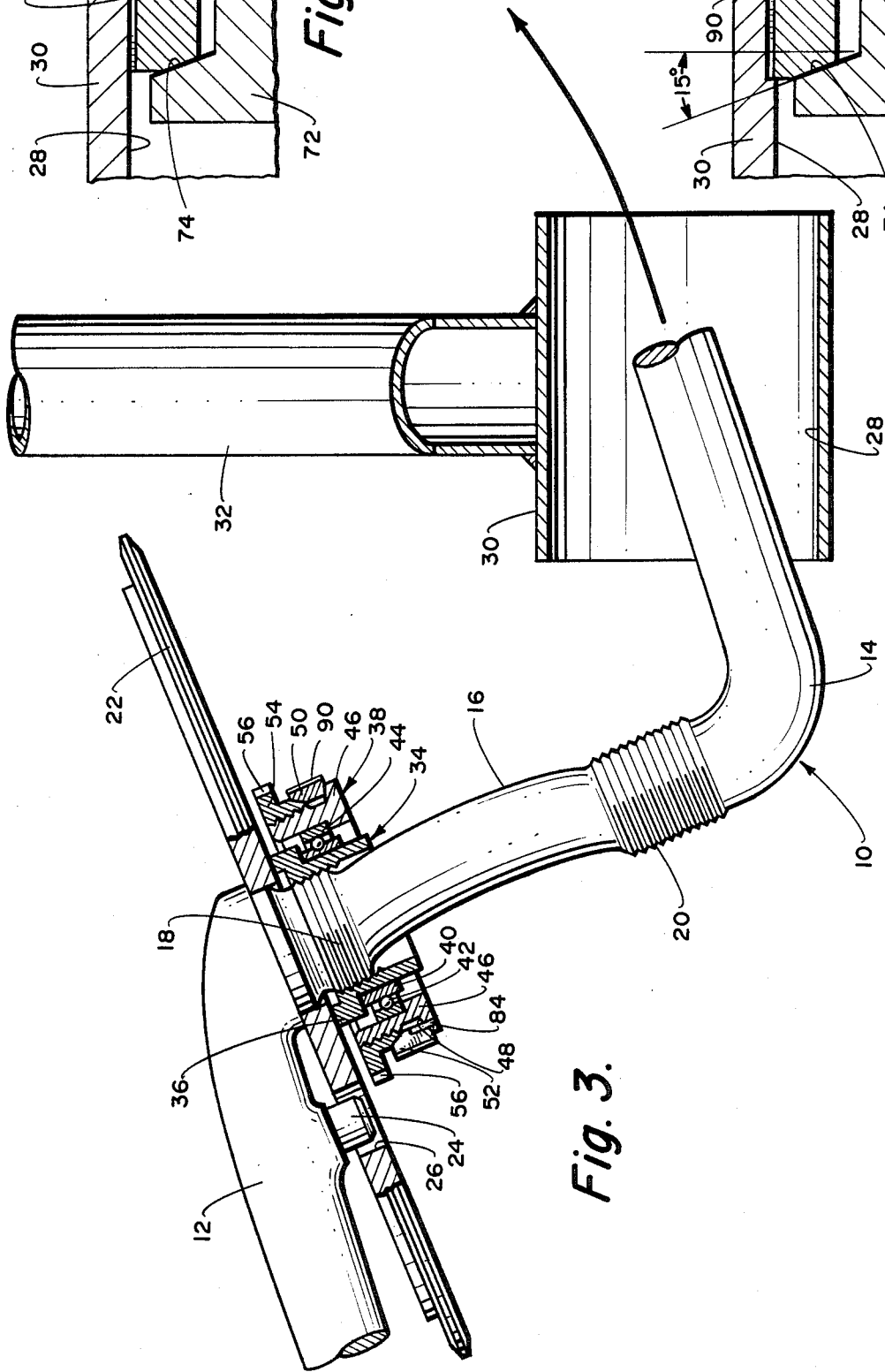

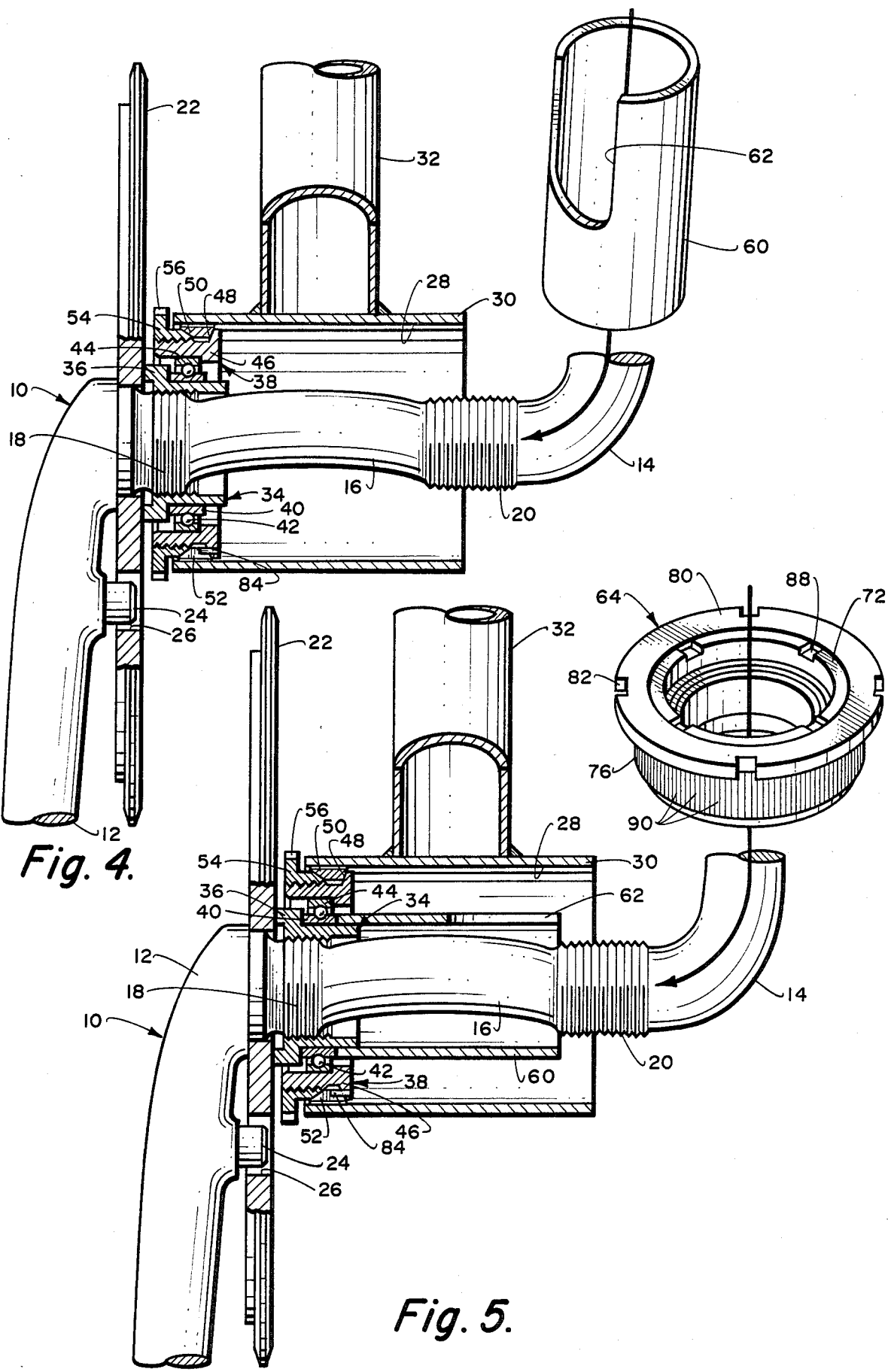

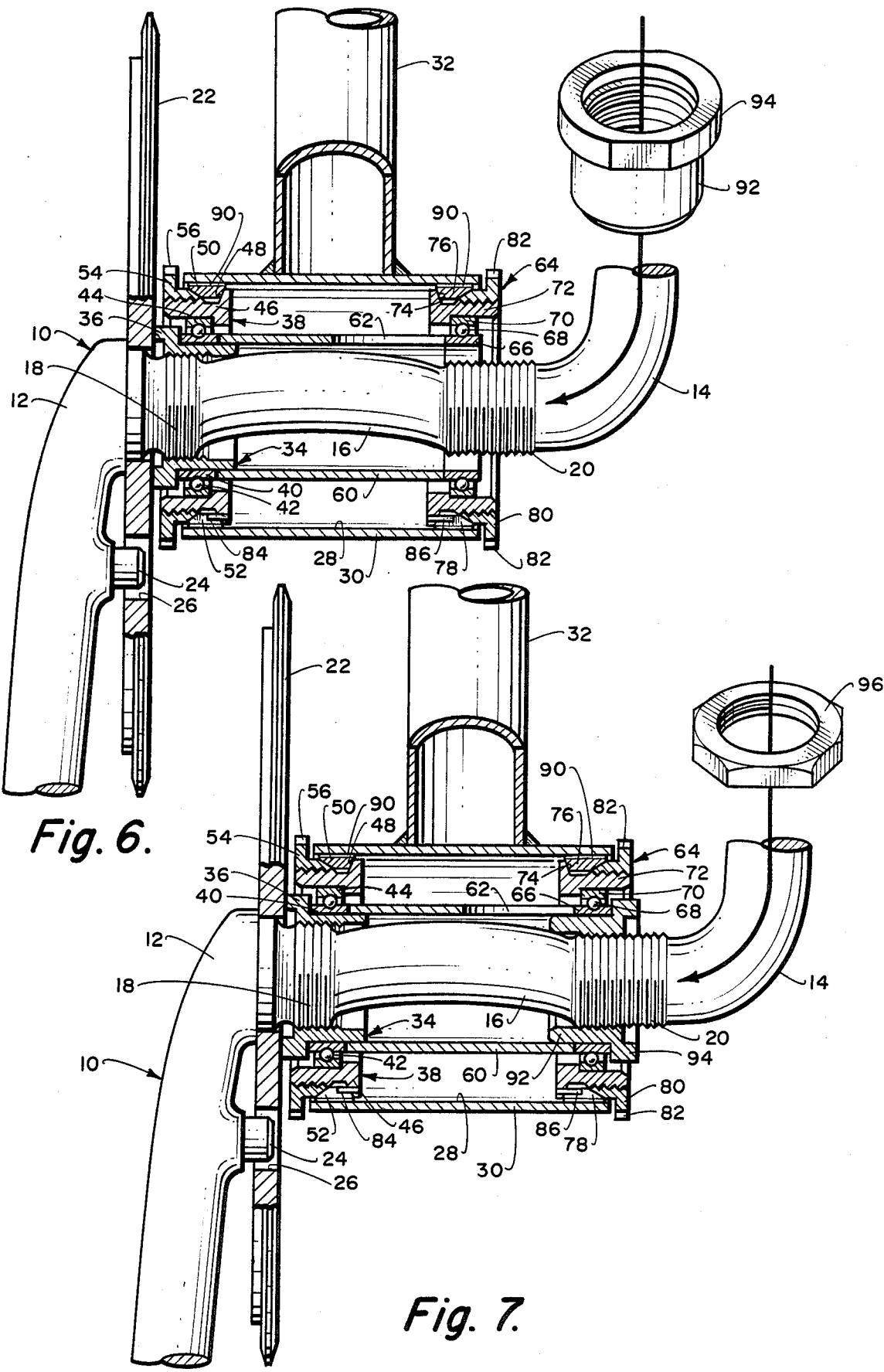

BICYCLE CRANK BEARING ASSEMBLY

BACKGROUND OF THE INVENTION

The field of this invention relates to a bearing assembly for the crank of a bicycle.

Bicycles, and particularly racing bicycles, must be manufactured with a high degree of precision and be accurately assembled and adjusted to insure optimum performance. Even slight power losses, due to friction caused by misalignment or improperly adjusted parts, are significant in view of the fact that all the power for operating the bicycle is derived from the rider. It is therefore important to eliminate sources of power loss, or at least reduce power loss so that the maximum amount of power will be derived to ride the bicycle.

In this regard, one particularly critical area is the pedal crankshaft which carries the chain sprocket and pedals. The crankshaft is supported within the hub by a bearing assembly. To insure most effective operation of the crank, there must be no "binding up" of the bearing assembly during rotation of the crank. Also, there must not be any slippage of the crank with respect to the bearing assembly and the total rotational movement of the crank is across the bearing assembly. Still further, the chain sprocket mounted on the crankshaft must be accurately aligned with the chain sprocket on the rear wheel of the bicycle. Any misalignment results in lost power.

It has been known that in order to obtain maximum power transmission, the hub casing must be manufactured to extremely close tolerances. These close tolerances are normally lost when the hub casing is welded to the frame of the bicycle due to thermal distortion during the welding operation. No matter how much care is taken in welding, it is virtually impossible to prevent thermal distortion from occurring. This thermal distortion causes the hub casing the assume other than a cylindrical configuration, with the configuration being a slight egg shape. The bearing assembly for the crank is designed to be installed within a cylindrical hub. When the installer attempts to insert the bearing assembly, the insertion becomes difficult, and in some cases, impossible to achieve. In the vast majority of the cases, the operator merely "hammers in" the bearing assembly in the position within the hub casing. As a result, the bearing assembly is initially stressed which causes such to either totally "bind up" and not operate, or operate at a less than maximum operating level.

In the past, attempts have been made to design a bearing assembly which compensates for the thermal distortion and slight difference of inside diameter and length of the hub casings. One common attempt relates to the use of bearing caps which are forced within each end of the hub casing. Although these bearing caps are allegedly designed to experience a minimal effect due to this distortion, such is normally not the case. Although the problem is diminished somewhat, still bearing assemblies are not able to freely rotate at the optimum level. Power losses and excessive wear does occur in operation of the crank within a prior art bicycle.

SUMMARY OF THE INVENTION

The apparatus of this invention relates to a bearing assembly which is to be installed within an enclosing open ended chamber, such as the hub casing of a bicycle. The bearing assembly is to be mounted on, and rotatably support, a crank which is to be operated by the feet of the user of the bicycle to propel the bicycle. The inner races of the spaced-apart bearing units of the bearing assembly are connected together by the use of a cylindrically shaped spacer. The spacer may include an elongated slot which is open to one end of the spacer. The slot is to be used in positioning the spacer in moving such along the crank to permit the spacer to make a right angle bend if such a bend occurs within the crank. Mounted on the outer race of each bearing unit is an expanding ring assembly. Each expanding ring assembly is to be snugly located within the chamber of the hub casing and when tightened, each expanding ring assembly is moved into tight engagement with the wall of the chamber of the hub casing.

The primary objective of the present invention is to construct a precision sealed bearing assembly for the crank of a bicycle that can expand to fit the large style hub casing which may be out of round or have slight differences of inside diameter and length, and to maintain a constant predetermined load on the bearings without the danger of accidentally locking the bearing. Prior to this invention, users were forced to use the standard, poor quality, non-precision, loose ball or caged ball bearing units. The recent, frequently used cupped sealed bearing units do not offer optimum utilization of the bearings because of the inability to capture the bearing races and maintain a constant load on the bearing. The existing bearing systems usually must either float the bearings, float the shafts, float the bearing housings or a combination of all three, and sometimes in desperation, even use shims as a last resort to guard against locking the bearings. The final result is inefficient utilization of the bearing through poor bearing design.

Another objective of this invention is to have a quick and easy method of installing and removing the bearing assemblies, in order to service the bearings and other parts of the bearing assembly.

Still another objective of this invention is to mount the crank shaft on a bearing assembly wherein the bearing assembly optimally low frictionally rotationally supports the crank with respect to the hub chamber.

Another objective of this invention provides for supporting the crankshaft such that the lateral position of the crankshaft with respect to the hub casing can be adjusted so that the chain sprocket mounted on the crankshaft is located in its most desirable position.

BRIEF DESCRIPTION OF THE DRAWINGS

FIG. 3 is a view similar to FIG. 2 but with the inner bearing assembly located about the inner bearing adapter and then showing the crank being inserted within an internal chamber of a hub casing;

FIG. 4 is a view similar to FIG. 3 showing inner bearing assembly located in its proper position within the internal chamber of the hub casing and further showing beginning installation of the spacer to be located about the center section of the crank to connect together the inner races of the bearings;

FIG. 5 is a view similar to FIG. 4 showing the spacer in its proper position and further depicting installation of the outer bearing assembly within the internal chamber of the hub casings;

FIG. 6 is a view similar to FIG. 5 showing the outer bearing assembly in its proper position within the hub casing within the internal chamber of the hub casing and further depicting installation of the outer bearing adapter in its proper position between the outer section of the crank and the outer bearing assembly;

FIG. 7 is a view similar to FIG. 6 showing the outer bearing adapter in its proper position and further depicting the installation of the lock nut which tightly secures together the inner races of each of the bearings and the spacer;

FIG. 11 is an enlarged view of the expanding ring assembly included within the outer bearing assembly of the present invention showing the expanding ring assembly in the loosely installed, or non-secured position; and FIG. 12 is a view similar to FIG. 11 but showing the expanding ring assembly in the completely secure, or tightened position.

DETAILED DESCRIPTION OF THE SHOWN EMBODIMENT

Figures 1, 2:
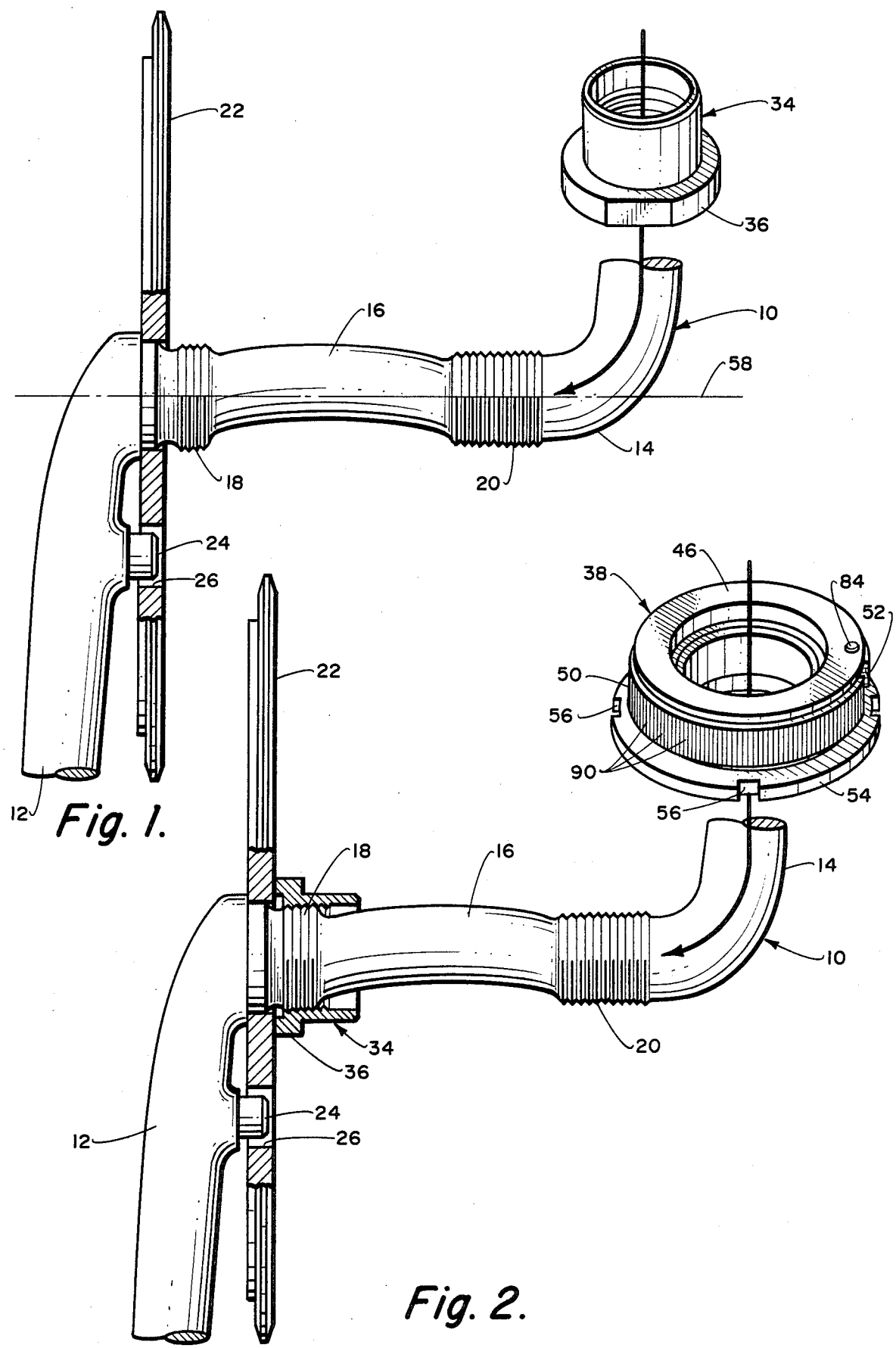
FIG. 1 is a side elevational view showing a typical bicycle crank with an inner bearing adapter shown during installation of such about the crank to then be located against the chain sprocket, which is attached at the inner end of the crank.
FIG. 2 is a view similar to FIG. 1 but showing the bearing adapter in place with the inner bearing assembly shown being installed in position about the bearing adapter.
Figure 8:
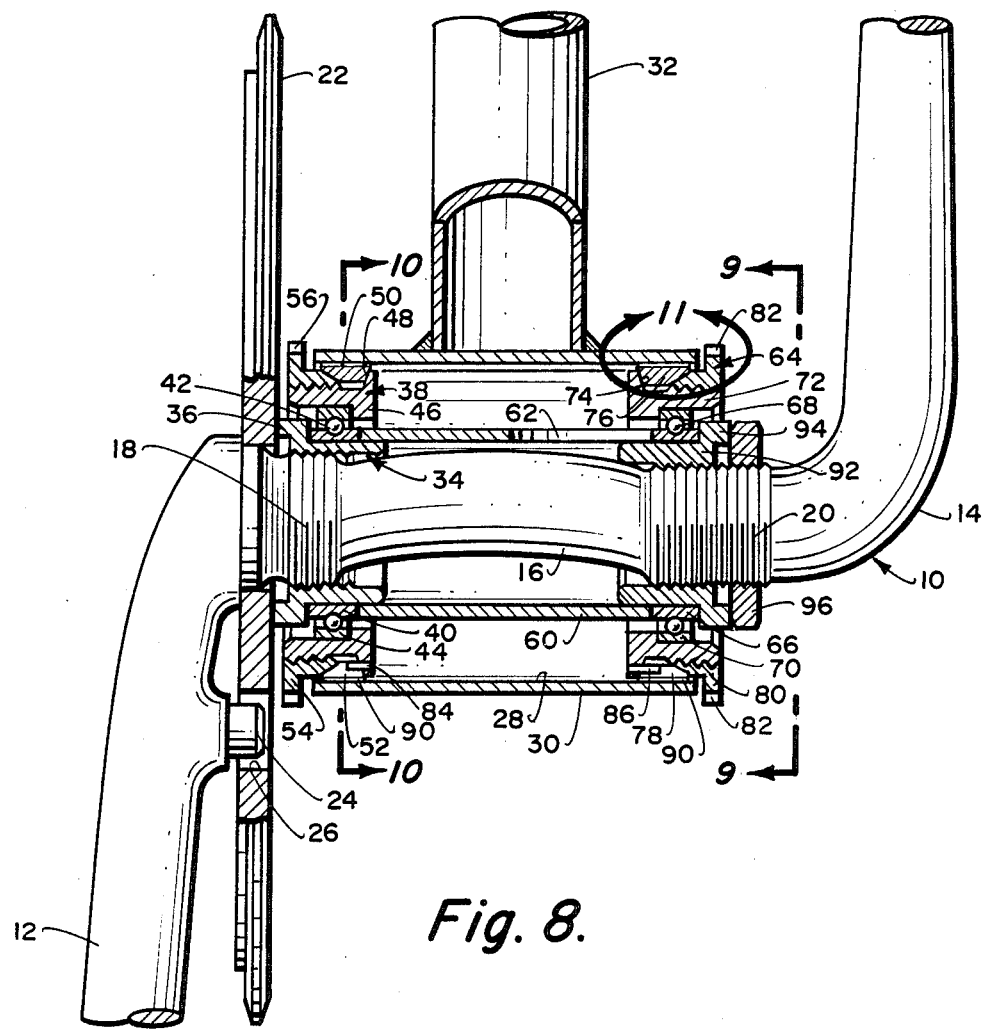
FIG. 8 is a cross-sectional view similar to FIG. 7 showing the completed bearing assembly in its properly installed position within the internal chamber of the hub casing.
Figure 9:
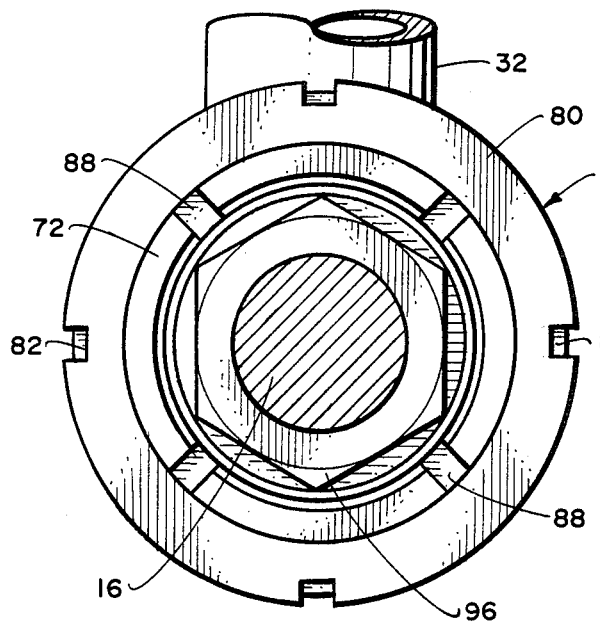
FIG. 9 is an end view, partly in cross-section, of the outer end of the bearing assembly of this invention taken along line 9—9 of FIG. 8.
Figure 10:
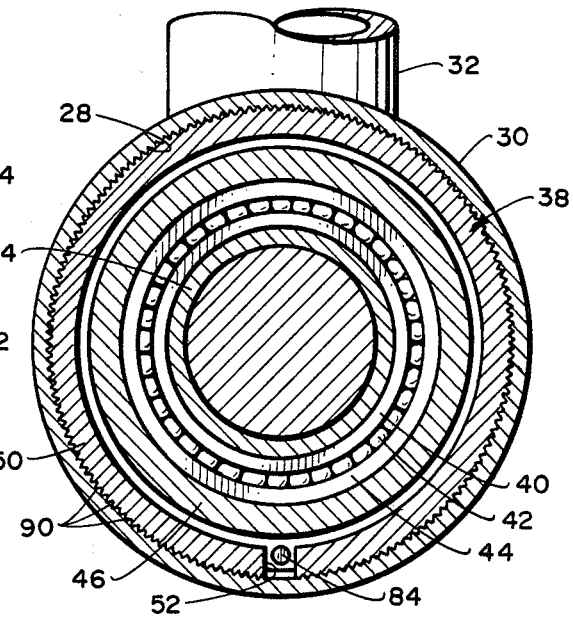
FIG. 10 is a cross-sectional view through the inner bearing assembly of this invention taken along line 10—10 of FIG. 8.

Ball bearings have long been used to support a loaded moving part. The balls are located between inner and outer races which are used to confine the balls within a given plane to achieve the most satisfactory low frictional movement of the loaded moving part.

Ball bearings function most satisfactorily when the bearings are subjected solely to radial forces with respect to the longitudinal center axis of the loaded moving part which the bearings are mounted thereon. If the bearings are subjected to, even minorly, a longitudinal force (that is, in a direction along the longitudinal center axis of the loaded moving part), the low frictional motion which is to be obtained by the bearings is significantly reduced. Binding up of the balls within the bearings will occur. Also, the loaded moving part will slip with respect to the inner race of each bearing which further adds to a diminished low frictional movement.

A bicycle has a crank which is connected to foot pedals which in turn are operated by the user to produce rotational movement. Such a crank 10 is shown in the drawings. The crank 10 is shown to be an integral one piece unit defining a first arm 12 and a second arm 14 which extend in opposite directions with respect to each other about a connecting center section 16. This means that the longitudinal center axis of each arm 12 and 14 is located substantially perpendicular to the longitudinal center axis of center section 16. The connecting center section 16 has a pair of spaced apart threaded sections 18 and 20. Threaded section 18 is of a slightly larger diameter then threaded section 20, the purpose of which will become apparent further on in the description.

It has been common in the past to construct the crank 10 of separate pieces, with the center section 16 being attached by tapered pin bolts to the arms 12 and 14. However, in recent years, the use of the integral one piece crank 10 has, become rather popular with those engaged in the manufacture of bicycles for the sport of moto-cross. The reason being that the integral one-piece crank 10 can be manufactured very inexpensively from hi-carbon heat treatable steel, thus producing a very durable crank. It is to be understood that the subject matter of this invention can also be used with cranks that are constructed of a plurality of parts, rather than just a single integral unit. The irregularly shaped crank 10 is shown because it is the most difficult type of crank to deal with for the satisfactory installation of a bearing assembly about the crank 10.

It is to be understood that in dealing with bicycles, the crank 10 is not only initially installed, the crank and its associated bearing assemblies may be removed at a later date for reason of repair, maintenance or replacement. The bearing assembly of the present invention, as well as its method of installation, is designed in particular to accommodate not only the initial installation, but later installation by even the most unskilled individuals, so that the crank 10 is installed in a manner to be totally rotatably supported by its connected bearing units, as well as being in proper alignment for maximum transmission of force to the rear wheel of a bicycle through the use of the rotational movement of the crank 10.

Mounted on the crank 10 directly adjacent the first arm 12 is a chain driving sprocket 22. The chain driving sprocket 22 is to be connected to a chain (not shown) which in turn will be connected to a driven sprocket (not shown) which is attached to the rear wheel (not shown) of the bicycle (not shown). The sprocket 22 is fixed in position relative to the crank 10 by means of pin 24 which is located within opening 26 formed within the sprocket 22.

The crank 10 is to be low frictionally, rotatably supported within the internal chamber 28 of an open ended hub casing 30. The hub casing 30 is constructed of a metal, usually steel, and is attached, as by welding, to frame member 32 of the bicycle. Although the hub casing 30 is constructed as a cylinder and of a high degree of tolerance, during the welding operation of the frame member 32 to the hub casing 30, invariably the hub casing 30 will assume a certain amount of "out of roundness" which is caused by the thermal distortion during the welding operation. It is this "out of roundness", and the variations in inside diameter and overall length which has been the principal cause of designing of the present invention.

The mounting of bearing assemblies on the crank 10 and the locating of such within the internal chamber 28 will now be described in detail: The installer grasps a first bearing adapter 34, which is internally threaded and terminates at its outer end in a flange 36. Because the threads 20 are of a smaller diameter than threads 18, the second arm 14 can pass readily through the bearing adapter 34 with such passing over the threaded section 20 to then engage with the threaded section 18. The bearing adapter 34 is then securely tightened so that the flange 36 will securely abut against the inner surface of the sprocket 22. This position is clearly shown in FIG. 2 of the drawings.

The installer then selects an inner bearing assembly 38 as an assemblied unit and similarly, such is moved along arm 14 and is located in a close fitting relationship onto the exterior surface of the bearing adapter 34 as is clearly shown in FIG. 3 of the drawings. The first bearing assembly 38 includes an inner race 40, which is direct contact with the bearing adapter 34. Supported about the inner race 40 are a plurality of ball bearings 42. A ring forming the outer race 44 is located about the bearings 42. The outer race 44 is pressed into the interior of a bearing housing 46. The inner exterior surface of the bearing housing 46 is formed into an annular shoulder 48. Abutting against the annular shoulder 48 is a split ring 50 which can be fabricated of different materials (steel, plastic, rubber) depending on load or shock absorbing characteristics required. The split ring 50 includes a space or gap 52. A lock ring 54 is threadably connected onto a portion of the exterior surface of the bearing housing 46 and the inner surface of the lock ring 54 is in contact with the split ring 50. The lock ring 54 includes a plurality of spaced apart indentations 56 which are to connect with a wrench, such as a spanner wrench (not shown) so the lock ring 54 can be turned relative to the bearing housing 46. It is to be noted that the inclination of the shoulder 48 is only about fifteen degrees in respect to a line perpendicular to the longitudinal center axis 58 of the center section 16. It is also to be noted that the inner surface of the lock ring 54 is inclined forming an annular beveled surface which is located at an angle approximately sixty degrees in respect to line perpendicular to the longitudinal center axis 58. Inclinations of different degrees may be used to compensate for different bearing tolerances and to change lift power and locking characteristics of bearing assembly to hub chamber. The reason for this will become apparent further on in the description.

The installer, now having located the bearing assembly 38 in its proper position on the bearing adapter 34, now inserts end 14 of the crank 10 through the internal chamber 28 until the center section 16 is centrally disposed within the internal chamber 28. The installer then slides a spacer sleeve 60 along the end 14, past threaded section 20 until the inner edge of the sleeve 60 abutts inner race 40. In order to facilitate making of the bend between center section 16 and the end 14, there is formed within the sleeve 60 an elongated slot (or cutout) 62. The slot 62 is open at one end of the sleeve 60 and extends to the approximate mid-point of the length of the sleeve. The bend in the crank 10 is to extend within the slot 62 as the sleeve 60 makes the turn from the end 14 to the center section 16.

The installer then selects a second bearing assembly 64, which is essentially identical to the bearing assembly 38 and passes such along the end 14 until the bearing assembly 64 is located in a facing relationship with the bearing assembly 38 and within the internal chamber 28. The outer, or second bearing assembly 64, similarly includes an inner race 66, ball bearings 68, an outer race 70, a bearing housing 72, a shoulder 74, a split ring 76 which has a gap 78 and a lock ring 80. The lock ring 80 includes indentations 82, which are similar to indentations 56.

It is to be noted that there is a pin 84 mounted within the bearing housing 46. This pin 84 extends within the gap 52. The function of the pin 84 is to prevent rotative relative movement of the split ring 50 relative to the bearing housing 46. Similarly there is a pin 86 located within the gap 78. The pin 86 is fixedly mounted within the bearing housing 72.

It is to be further noted that the exterior, or outermost edge of the bearing housing 72 includes a plurality of indentations 88. These indentations 88 are to similarly connect with a tool, such as a spanner wrench (not shown) in a similar manner as such would connect with indentations 82. The wrench connecting with indentations 88 would be of a different size than would connect with indentations 82. It is also to be noted that although not shown, similar indentations would be formed within the exterior, or outer surface, of the bearing housing 46. The function of the indentations 88 and the indentations formed within the outer surface of the bearing housing 46 will be described further on in the specification.

The exterior surface of each of the split rings 50 and 76 include a plurality of splined serrations 90 or can have a smooth exterior surface. The serrations 90 define short longitudinal sections, with the longitudinal axis of each section being in alignment with the longitudinal center axis 58. The locating of the spline serrations 90 in this manner is that they tend to prevent rotational movement between the split rings 50 and 76 within the wall of the interior chamber 28 but does not hinder longitudinal adjusting movement of the split rings 50 and 76 in respect to the wall of the interior chamber 28. The reason for this will also be described further on in the specification.

The installer then proceeds to locate an outer bearing adapter 92, which has a flange 94 about the second arm 14 and locates such so that the exterior surface of the bearing adapter 92 connects with the inner race 66. The bearing adapter 92 connects with the threads 20.

During installation of each of the split rings 50 and 76 in its proper position, each split ring must be manually squeezed a slight amount in order to be inserted within the internal chamber 28. Each split ring 50 and 76 will then expand slightly to be snug against the wall of the internal chamber 28. This slight frictional force is important during securing each of the expanding ring assemblies included within each of the bearing assemblies, as will become apparent further on in the description.

With the bearing assemblies as installed within FIG. 7 of the drawings, the installer proceeds to tighten the bearing adapter 92 to secure together as essentially an integral unit the inner races 40 and 66 and spacer 60. The operator then proceeds to adjust the longitudinal position of the crank 10 and its assembled bearing assemblies 38 and 64 to achieve the desired correct alignment within the hub casing 30. This longitudinal adjustment is permitted because the serrations 90 are formed so as to permit this adjustment.

When the desired location has been obtained, the operater then rotates lock ring 54 relative to bearing housing 38, by the use of appropriate spanner wrenches. Similar rotational movement motion is to then occur between the lock ring 80 and the bearing housing 72. One wrench is to engage with the indentations 88 and the other wrench is to engage with the indentations 82 so that rotational movement can occur therebetween. However, the use of indentations 88 may not be necessary due to the frictional force which occurs between the wall of the chamber 28 and the split ring 76 which in turn prevents rotative movement of the bearing housing 72 due to the pin 86 being located within the gap 78. However, indentations 88 are provided if necessary. Similarly, as previously mentioned, there will be indentations on the exterior or outer surface of the bearing housing 46 which are not shown to be utilized for the same purpose.

During the rotational movement occuring between the bearing housing 46 and also the lock ring 54 and the bearing housing 72 and the lock ring 80, each of the split rings 50 and 76 will be forced into tight engagement with the wall of the chamber 28. This tight engagement is clearly shown in referring to FIGS. 11 and 12 of the drawings. The reason for the different inclinations with respect to the shoulder 48 and the inner edge of the lock ring 54 and also the shoulder 74 and the inner edge of the lock ring 80 is so that the rotational movement between the bearing housing 46 and the lock ring 54 and the bearing housing 72 and the lock ring 80 produces a maximum radially outward movement of its respective lock rings 50 and 76. Longitudinal movement of the lock rings 50 and 76 is not desired since such movement will in turn impart a longitudinal force or thrust on each of their respective bearing assemblies which in turn will tend to "bind up" the balls 42 and 68. The inner edge of each of the lock rings 54 and 80 will tend to "slide under" its respective split ring 50 and 76. The more perpendicular surface of the shoulders 48 and 74 assist in causing the split rings 50 and 76 to move radially outward into engagement with the wall of the internal chamber 28. Even so, there will normally be a slight longitudinal movement which will be transmitted to the ball bearings 42 and 68. However, this movement is no more than a few thousanths of an inch which is well within the tolerances of the bearing assemblies.

In order to insure that the bearing adapter 92 will not tend to become loose, there is utilized a lock nut 96 which engages with the threads 20 and is to be tightened against the flange 94.

What is claimed is:

1. In combination with a hub, said hub having a substantially cylindrical internal chamber, a crank extending through said internal chamber, said crank having a straight center section each end of which is integrally attached to a separate elongated pedal arm, said straight center section being located within said internal chamber, a bearing assembly to be located about said straight center section within said internal chamber, said bearing assembly comprising:
   a first bearing adapter threadably secured on said straight center section, a second bearing adapter threadably secured on said straight center section, said second bearing adapter being spaced from said first bearing adapter;
   a first bearing assembly including a first inner race and a first outer race;
   a second bearing assembly including a second inner race and a second outer race;
   said first inner race being mounted on said first bearing adapter, said second inner race being mounted on said second bearing adapter;
   means connecting together said first and second inner races, said second bearing adapter being threadingly tightenable to tightly secure in position said first and second bearing adapters with said means located therebetween; and
   a first expanding member assembly mounted on said first outer race, a second expanding member assembly mounted on said second outer race, both said first and second expanding member assemblies being expandable into tight engagement with the wall of said internal chamber fixing said outer races to said wall yet permitting free rotation of said crank.

2. The combination as defined in claim 1 wherein:
said means comprising a sleeve, said sleeve having a slot formed in the wall surface of said sleeve, said slot being open at one end of said sleeve.

3. The combination as defined in claim 1 wherein:
said first expanding member assembly including a first expanding ring, said second expanding member assembly including a second expanding ring, said first expanding ring including a first gap forming a first split ring, said second expanding ring having a second gap forming a second split ring.

4. The combination as defined in claim 3 wherein:
the surface of both said first expanding ring and said second expanding ring that contacts the wall of said internal chamber each being formed to include a series of serrations.

5. The combination as defined in claim 3 wherein:
said first expanding ring being mounted on a first bearing housing, said second expanding ring being mounted on a second housing, a first pin being mounted on said first bearing housing, a second pin being mounted on said second bearing housing, said first pin to be located within said first gap, said second pin being located within said second gap, said first pin to function to prevent relative rotation of said first expanding ring relative to said first bearing housing, said second pin functions to prevent relative rotation of said second expanding ring relative to said second bearing housing.

6. The combination as defined in claim 5 wherein:
said first expanding member assembly including a first lock ring, said second expanding member assembly including a second lock ring, said first lock ring being threadingly mounted on said first bearing housing, said second lock ring being threadably mounted on said second bearing housing, surface means located between said first and second lock rings and their respective first and second bearing housings, upon relative movement between said first and second rings and their respective first and second bearing housings said surface means causes expansion of said first and second expanding rings.

7. The combination as defined in claim 6 wherein:
said surface means comprises a first pair of surfaces connected with said first expanding ring and a second pair of surfaces connected with said second expanding ring, said first pair of surfaces being of different inclinations said second pair of surfaces being of different inclinations.

8. A bearing assembly for rotatingly mounting an irregularly shaped crank within an enclosing open ended chamber, said irregularly shaped crank comprising an integral structure of a pair of arms and a connecting center section, said arms extending in opposite directions from said connecting center section, the longitudinal center axis of each said arm being located substantially perpendicular to the longitudinal center axis of said connecting center section, said chamber having a wall, said bearing assembly comprising:
   a first bearing unit and a second bearing unit, said first bearing unit being spaced from said second bearing unit, said first bearing unit having a first inner race and a first outer race, said second bearing unit having a second inner race and a second outer race;
   means connecting together said first and second inner races, said means comprising an open ended sleeve, said open ended sleeve having a fore end and an aft end, said fore end abutting said first inner race, said aft end abutting said second inner race, said sleeve having a cut-out section formed within the wall surface of said sleeve, said cut-out section extending from said fore end and terminating at the approximate mid-point of the longitudinal length of said sleeve, said cut-out section permitting conducting of said crank through said sleeve past bends in said crank until said sleeve is located about said connecting center section; and a first expanding ring assembly mounted on said first outer race, a second expanding ring assembly mounted on said second outer race, both said first and second expanding ring assemblies being expandable into tight engagement with said wall of said enclosing open ended chamber fixing said outer races to said wall yet permitting free rotation of said crank.

9. The bearing assembly as defined in claim 8 wherein:

the portion of said first expanding ring assembly and said second expanding ring assembly which is in contact with the wall of said enclosing open ended chamber forming a serrated surface.

10. A bearing assembly for rotatingly mounting an irregularly shaped crank within an enclosing open ended chamber, said chamber having a wall, said bearing assembly comprising:

a first bearing unit and a second bearing unit, said first bearing unit being spaced from said second bearing unit, said first bearing unit having a first inner race and a first outer race, said second bearing unit having a second inner race and a second outer race;

means connecting together said first and second inner races;

a first expanding ring assembly mounted on said first outer race, a second expanding ring assembly mounted on said second outer race, both said first and second expanding ring assemblies being expandable into tight engagement with said wall of said enclosing open ended chamber fixing said outer races to said wall yet permitting free rotation of said crank; and said first expanding ring assembly including a first split ring, said second expanding ring assembly including a second split ring, said open ended chamber having a longitudinal center axis, first force applying means included within said first bearing unit, second force applying means included within said second bearing unit, said first force applying means being connected to said first split ring, said second force applying means being connected to said second split ring, said first force applying means being movable in a direction parallel to said longitudinal center axis which by second means causes said first split ring to expand in a direction substantially perpendicular to said longitudinal center axis, said second force applying means being movable in a direction parallel to said longitudinal center axis which by third means causes said second split ring to expand in a direction substantially perpendicular to said longitudinal center axis.

11. The bearing assembly as defined in claim 10 wherein:

said second means comprising an inclined surface arrangement, said third means comprising a further inclined surface arrangement.

* * * * *